Nov. 28, 1933. W. GENSECKE 1,936,964
STILL FOR SUBSTANCES OF HIGH BOILING POINT
Filed Nov. 29, 1932
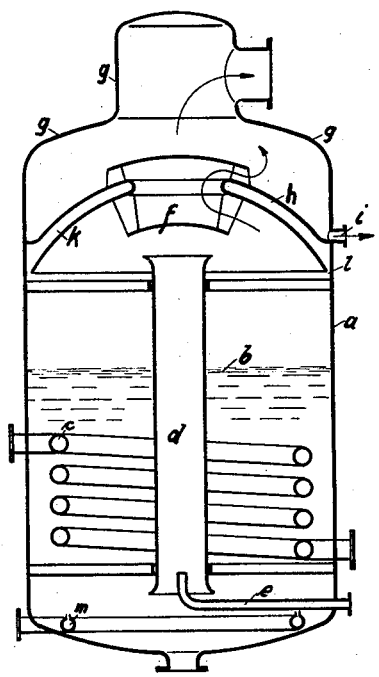

Patented Nov. 28, 1933

1,936,964

UNITED STATES PATENT OFFICE 1,936,964

STILL FOR SUBSTANCES OF HIGH BOILING POINT

Wilhelm Gensecke, Gonzenheim, near Frankfort-on-the-Main, Germany, assignor to American Lurgi Corporation, New York, N. Y., a corporation of New York Application November 29, 1932, Serial No. 644,923, and in Great Britain June 6, 1932.

2 Claims. (Cl. 202—182)

This invention relates to a still for substances of high boiling point.

The distillation of substances of high boiling point, such as the fatty acids contained in vegetable or animal oils, is attended with the inconvenience that a portion of the vaporized substance condenses on the top wall of the still and runs back, in liquid form, into the still. Attempts have been made to obviate this inconvenience by heating the upper portions of the still, thus acting as a condenser, and maintaining them at such a high temperature that condensation is precluded. This method of operating results in practical difficulties, since it is often found that, owing to the shape of the apparatus, not all the relevant portions of the vessel can be raised to the requisite temperature. Although the condensation can be restricted by means of insulating members, it cannot be entirely prevented thereby.

By means of an apparatus designed in accordance with the present invention the undesired refluxing of the condensate formed in the top of the still can be prevented to a practically complete extent. The essential feature of the invention consists in the arrangement, above the level of the liquid in the still, of a bell-shaped member, which is provided with a central opening for the passage of the vapours, and is designed so as to catch, and remove laterally, any condensate that would run or drop back into the still. Such a member, however, would not suffice for the complete attainment of the desired effect, for, although the vapours condensed on the upper wall of the still can no longer gain access to the actual distillation chamber, the under side of the bell-shaped member provided for their collection, itself acts as a condenser. Consequently, according to the invention, there is disposed below the bell-shaped collector a second bell-shaped member which is so mounted as to form a heat insulating space between the underside of the collector and the distillation chamber. The heat insulation is obtained, in known manner, by leaving, between the collector and the insulating bell, a space filled with stagnant gas.

In order more clearly to understand the nature of the invention, reference is made to the accompanying drawing which illustrates diagrammatically and by way of example, one embodiment of still according to the invention, and in which:—

$a$ is the still, which is filled, up to the level $b$ with the substance to be treated. The heat required for distillation is supplied through a heating coil $c$, and an upcast pipe $d$, into which steam is admitted through $e$, is provided for the circulation of the liquid, which is thus effected in accordance with the known air-lift, or Mammoth-pump principle. The mixture of steam and liquid ascending through $d$ is diverted laterally, at the top, by means of a baffle plate $f$. To increase the agitation in the still, a perforated steam spray $m$ may be provided, into which steam is admitted in the same manner as through $e$. The vapours condensing on the top surface $g$ of the still, fall on to the bell-shaped member $h$ according to the invention and are removed, at the side, through $i$. In order to prevent the under side of the member $h$ from acting as a condenser, the invention provides a second bell-shaped member $k$. This is connected, on its inner edge, with $h$, but an opening $l$ is left between $k$ and the cylindrical shell of the still, so that the same absolute pressure exists in the space between $h$ and $k$ as in the still $a$. The gas situated in the intermediate space stagnates and serves to insulate the member $h$ thermally, so that no condensation against the under side of member $k$ occurs. Stagnant gases are excellent heat insulators in themselves, and in the present instance, the insulating effect is considerably increased when—as is very often the case—the distillation is performed in vacuo. Since the member $k$ is sprayed, to some extent by the liquid circulated in the still, and moreover, is not connected with the shell of the still—except perhaps for a few spacing and mounting members—the temperature of $k$ is not any lower than that of the distilled vapours and therefore no opportunity is afforded for the said vapours to condense.

I claim:—

1. A device, applied to stills, for preventing the refluxing, into the distillation chamber, of condensate forming on the upper walls of the still, said device comprising two bell-shaped members each provided with a central opening for the passage of fluid at which openings said members are connected together, the upper of the two bell-shaped members being mounted in liquid-retaining contact on the still wall at the periphery of the former and at a point above the liquid level of the still, said members being of substantially the same contour and spaced apart from each other to form an intermediate space communicating with the distillation chamber, and means for withdrawing liquid through the still wall at a point above the periphery of the upper of the said bell-shaped members.

2. A device applied to stills, for preventing the refluxing, into the distillation chamber, of condensate forming on the upper walls of the still, said device comprising two bell-shaped members each provided with a central opening for the passage of fluid at which openings said members are connected together, the upper of the two bell-shaped members being mounted in liquid-retaining contact on the still wall at the periphery of the former and at a point above the liquid level of the still, said members being of substantially the same contour and spaced apart from each other to form an intermediate space, the lower of the two bell-shaped members being spaced apart from the still wall at the periphery of the said member to provide a slit opening communicating between the distillation chamber and said intermediate space, said lower member being connected with said upper member only at their respective central openings, and means for withdrawing liquid through the still wall at a point above the periphery of the upper of the said bell-shaped members.

WILHELM GENSECKE.